United States Patent
Browder et al.

(10) Patent No.: US 12,450,439 B1
(45) Date of Patent: Oct. 21, 2025

(54) SYSTEM AND METHOD FOR IDENTIFYING ONE OR MORE CRITERIA FROM TEXTUAL DATA

(71) Applicant: Signet Health Corporation, North Richland Hills, TX (US)

(72) Inventors: Blake Browder, Dallas, TX (US); Joy Figarsky, Little Rock, AR (US)

(73) Assignee: Behavioral Health Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/957,794

(22) Filed: Nov. 24, 2024

(51) Int. Cl.
- *G06F 40/00* (2020.01)
- *G06F 16/355* (2025.01)
- *G06F 40/295* (2020.01)
- *G16H 40/20* (2018.01)

(52) U.S. Cl.
CPC .......... *G06F 40/295* (2020.01); *G06F 16/355* (2019.01); *G16H 40/20* (2018.01)

(58) Field of Classification Search
CPC .. G06F 40/295; G06F 40/279; G06F 16/9024; G06F 16/367; G06F 40/30; G06F 16/24578; G06F 3/04842; G06F 16/355; G06F 16/906; G06F 16/93; G06F 18/24323; G06F 40/20; G06F 40/284; G06F 40/242; G06F 40/247; G06F 40/237; G06N 20/00; G06N 20/20; G06N 20/10; G06N 3/08; G06N 3/042; G06N 3/0475; G06N 3/088; G06N 3/0895; G06N 3/09; G06N 3/091; G06N 3/096; G06N 5/048; G16H 10/60;

(Continued)

(56) References Cited

U.S. PATENT DOCUMENTS

| | | | |
|---|---|---|---|
| 9,311,449 B2 * | 4/2016 | Levin | G06Q 10/06312 |
| 11,379,513 B2 * | 7/2022 | Nazari | G06F 16/437 |
| 11,422,996 B1 * | 8/2022 | Muhlstein | G06F 16/22 |

(Continued)

FOREIGN PATENT DOCUMENTS

| | | |
|---|---|---|
| KR | 20210113042 A | 9/2021 |
| WO | 2022083140 A1 | 4/2022 |

OTHER PUBLICATIONS

Yeung, Serena, et al. "A computer vision system for deep learning-based detection of patient mobilization activities in the ICU." NPJ digital medicine 2.1 (2019): 11. (Year: 2019).*

(Continued)

*Primary Examiner* — Edgar X Guerra-Erazo
(74) *Attorney, Agent, or Firm* — Caldwell Intellectual Property Law

(57) ABSTRACT

A system for identifying one or more criteria from textual data including at least a processor and a memory communicatively connected to the at least a processor, wherein the memory contains instructions configuring the at least a processor to receive a plurality of data, identify one or more sets of criteria from the plurality of data, classify each of the one or more sets of criteria using natural language processing module, compare the one or more sets of criteria and the individual profile based on the embeddings, generate a context-specific set of criteria as a function of the comparison between the one or more sets of criteria and the individual profile, and apply the context-specific set of criteria using a dynamic decision template to generate an outcome.

18 Claims, 8 Drawing Sheets

(58) Field of Classification Search
CPC ........ G16H 50/70; G16H 50/20; G16H 15/00; G10L 15/063; G10L 2015/228
See application file for complete search history.

(56) References Cited

U.S. PATENT DOCUMENTS

| | | | |
|---|---|---|---|
| 11,600,380 B2 | 3/2023 | Martindale et al. | |
| 11,681,739 B2* | 6/2023 | Nazari | G06F 16/483 707/734 |
| 11,842,153 B2* | 12/2023 | Singhal | G06F 40/295 |
| 12,224,058 B2* | 2/2025 | Thomas | G06F 17/18 |
| 2010/0153132 A1* | 6/2010 | Barth | G16Z 99/00 705/2 |
| 2012/0191465 A1* | 7/2012 | Xue | G16H 70/00 705/2 |
| 2014/0108033 A1* | 4/2014 | Akbay | G16Z 99/00 705/2 |
| 2019/0304596 A1* | 10/2019 | Padala | G16H 40/20 |
| 2020/0097601 A1* | 3/2020 | Han | G06F 16/36 |
| 2021/0064649 A1* | 3/2021 | Nazari | G06F 16/4387 |
| 2021/0295987 A1* | 9/2021 | Thomas | G16H 50/20 |
| 2022/0084645 A1* | 3/2022 | Ginsburg | G16H 10/60 |
| 2023/0031412 A1* | 2/2023 | Singhal | G06F 16/9566 |
| 2023/0253100 A1 | 8/2023 | Caudill et al. | |

OTHER PUBLICATIONS

Chrusciel, Jan, et al. "The prediction of hospital length of stay using unstructured data." BMC medical informatics and decision making 21.1 (2021): 351. (Year: 2021).*

Aronsky, Dominik, et al. "Supporting Patient Care in the Emergency Department with a Computerized Whiteboard System." J Am Med Inform Assoc 15 (2008): 184-194. (Year: 2008).*

V. Maxville, J. Armarego and Chiou Peng Lam, "Intelligent component selection," Proceedings of the 28th Annual International Computer Software and Applications Conference, 2004. COMPSAC 2004., Hong Kong, China, 2004, pp. 244-249 vol. 1. (Year: 2004).*

A. R. M. Forkan, I. Khalil, A. Ibaida and Z. Tari, "BDCaM: Big Data for Context-Aware Monitoring—A Personalized Knowledge Discovery Framework for Assisted Healthcare," in IEEE Transactions on Cloud Computing, vol. 5, No. 4, pp. 628-641, Oct. 1-Dec. 2017. (Year: 2017).*

* cited by examiner

SYSTEM AND METHOD FOR IDENTIFYING ONE OR MORE CRITERIA FROM TEXTUAL DATA

FIELD OF THE INVENTION

The present invention generally relates to the field of data analysis and prediction. In particular, the present invention is directed to systems and methods for identifying one or more criteria from textual data.

BACKGROUND

Natural language processing (NLP) is used in a wide variety of everyday products and services. Some of the most common ways NLP is used is through voice-activated digital assistance on smartphones, email-scanning programs used to identify spam, and translation apps that decipher foreign languages. However, alone NLP may struggle to detect variability in language and/or ambiguous terms. This may mean that systems utilizing NLP may face challenges effectively processing and classifying textual data in the context of background information.

SUMMARY OF THE DISCLOSURE

In an aspect, a system for identifying one or more criteria from textual data may include a computing device, wherein the computing device includes at least a processor, and a memory communicatively connected to the at least a processor and containing instructions configuring the at least a processor to identify one or more criteria from textual data. The instructions may include: receive a plurality of data, identify one or more sets of criteria from the plurality of data, using a language processing module, classify each of the one or more sets of criteria using natural language processing (NLP), wherein classifying each of the one or more sets of criteria generates criteria embeddings from the one or more sets of criteria and generating profile embeddings from an individual profile, compare the one or more sets of criteria and an individual profile based on the embeddings, generate a context-specific set of criteria using a dynamic decision template to generate an outcome.

In another aspect, a method for identifying one or more criteria from textual data may include receiving a plurality of data, identifying one or more sets of criteria from the plurality of data, using a language processing module, classifying each of the one or more sets of criteria using the language processing module, wherein classifying each of the one or more sets of criteria includes generating criteria embeddings from the one or more sets of criteria, and generating profile embeddings from an individual profile, comparing the one or more sets of criteria and an individual profile based on the embeddings, generating a context-specific set of criteria as a function of the comparison between the one or more sets of criteria and the individual profile, and applying the context-specific set of criteria using a dynamic decision template to generate an outcome.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for identifying one or more criteria from textual data. In an embodiment, such systems and methods may identify specific criteria to reach a certain goal. For example, and without limitation, criteria may be related to patient stay criteria. The present systems and methods may extract such stay criteria from materials such as contracts and historical outcome data in order to optimize determinations.

Aspects of the present disclosure can be used to parse necessary criteria from textual bodies. Aspects of the present disclosure can also be used to optimize sets of criteria, which may lead decision makers to a more optimal solution. This is so, at least in part, because the present systems and methods may analyze historical data and optimize sets of criteria that lead to a successful outcome.

Aspects of the present disclosure allow for identifying one or more criteria from textual data. Exemplary embodiments illustrating aspects of the present disclosure are described below in the context of several specific examples.

Figure 1:
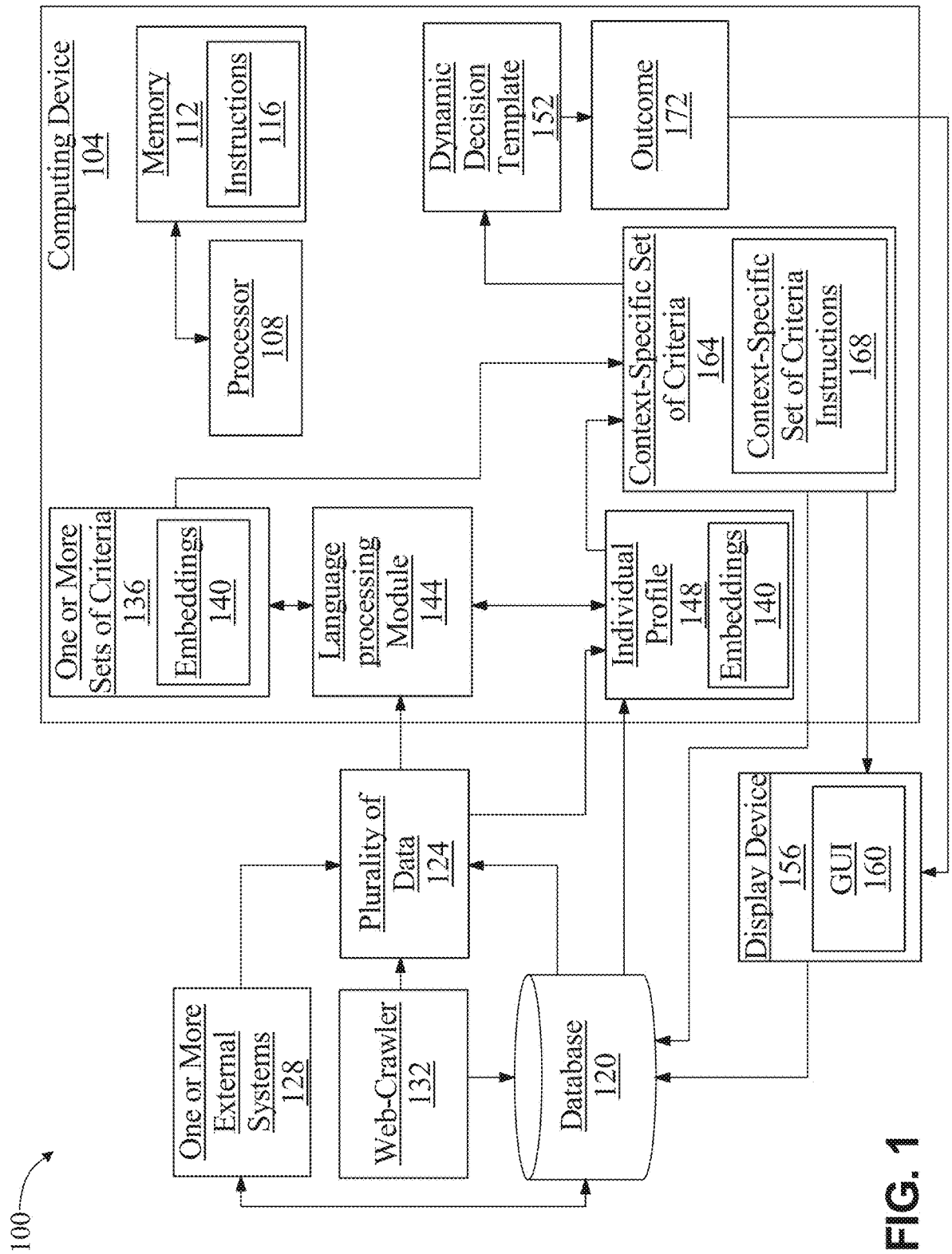
FIG. 1 is a block diagram of a system for identifying one or more sets of criteria from textual data.

Referring now to FIG. 1, an exemplary embodiment of a system 100 for identifying one or more criteria from textual data is illustrated. System 100 may include at least a processor 108 and a memory 112 communicatively connected to the at least a processor 108 and containing instructions 116. Wherein the instructions 116 configure the at least a processor 108 to receive a plurality of data 124, identify one or more sets of criteria 136 from the plurality of data 124, using a language processing module 144, classify each of the one or more sets of criteria using language processing module 144, wherein classification of each of the one or more sets of criteria 136 includes generating criteria embeddings from the one or more sets of criteria 136, and generating profile embeddings from an individual profile 148, compare the one or more sets of criteria 136 dynamic decision template 152 dynamic decision template 152 and the individual profile 148 based on the embeddings, generate a context-specific set of criteria 164 as a function of the comparison between the one or more sets of criteria 136 and the individual profile 148, and apply the context-specific set of criteria 164 using a dynamic decision template to generate an outcome 172.

Still referring to FIG. 1, system 100 includes a computing device 104. Computing device 104 includes a processor 108 communicatively connected to a memory 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions 116 and/or information may be transmitted to primary memory wherein information may be processed. In one or more embodiments, information may only be populated within primary memory while a particular software is running. In one or more embodiments, information within primary memory is wiped and/or removed after the computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 108. In one or more embodiments, data is transferred from secondary to primary memory wherein processor 108 may access the information from primary memory.

Still referring to FIG. 1, system 100 may include a database 120. The database 120 may include a remote database. The database 120 may be implemented, without limitation, as a relational database, a key-value retrieval database such as a NOSQL database, or any other format or structure for use as database that a person skilled in the art would recognize as suitable upon review of the entirety of this disclosure. The database 120 may alternatively or additionally be implemented using a distributed data storage protocol and/or data structure, such as a distributed hash table or the like. The database 120 may include a plurality of data 124 entries and/or records as described above. Data entries in database 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database 120 may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, the computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device 104. In one or more embodiments, server may be configured to perform one or more processes as described below to allow for increased computational power and/or decreased power usage by the system 100. In one or more embodiments, computing device 104 may transmit processes to server wherein computing device 104 may conserve power or energy.

Further referring to FIG. 1, Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in an embodiment, at least a processor 108 is configured to receive a plurality of data 124. A plurality of data 124 may be received from one or more external systems 128 that may have pre-processed the plurality of data 124. For example, without limitation data may have been scraped and then parsed and stored at database 120. In an embodiment, plurality of data 124 may be received from one or more databases 120, which may be local and/or global.

Continuing to reference FIG. 1, in an embodiment, a plurality of data 124 may include a plurality of governance data and a plurality of entity data. A "plurality of governance data" refers to information and metrics used to support and evaluate the governance of an organization, system, or process. Governance data helps organizations ensure that they are operating within legal and regulatory frameworks, achieving their objectives, and maintaining ethical standards. A plurality of governance data may include compliance data, risk management data, performance data, stakeholder data, financial data, liability data, and/or the like. Governance data may be collected or received from various sources, including internal reports, audits, regulatory filings, performance evaluations, stakeholder surveys, and/or the like.

With continued reference to FIG. 1, "a plurality of entity data" refers to comprehensive information about the entity or organization itself. For example, a plurality of entity data of a hospital may include information relating to departments, services, staff, patients, and/or operational metrics. Key components of entity data may include attributes such as name, location, type (e.g., general, specialty, teaching), capacity, and/or services offered; relationships such as staff, patients, and/or affiliations; operational data such as performance metrics, financial information, and/or liability information; and/or compliance and regulatory information such as details related to licenses, accreditations, and compliance with healthcare regulations. Liability information may include legal liabilities such as litigation claims (pending and/or settled), historic regulatory fines, and/or the like. Further, liability information may include liability data from an insurance policy for a hospital. A plurality of entity data may include a vast amount of data that may be parsed for relevant information related to patient stay criteria and/or matched with local regulations and/or requirements, patient preferences, liability data, and/or the like.

Still referencing FIG. 1, "patient stay criteria," as used throughout this disclosure, refers to the specific guidelines and standards used to determine the appropriate duration and conditions under which a patient should remain in a healthcare facility, such as a hospital. This criterion helps to ensure that patients receive the necessary care while also facilitating efficient resource use and hospital management. Key aspects of patient stay criteria may include medical necessity, clinical guidelines, discharge planning, insurance and reimbursement policies, and/or patient safety and outcomes 172. For example, patient stay criteria may include criteria surrounding surgical recovery, such as criteria that specifies that a patient must remain hospitalized for a minimum period post-surgery to monitor for complications and/or ensure proper recovery; criteria surrounding observation status, such as criteria that specifies that patients under observation may be required to meet certain criteria regarding symptom resolution or stability prior to discharge; criteria surrounding chronic conditions, such as criteria that patients with chronic illnesses may need to stay until they reach a specific benchmark, such as controlled blood pressure or stabilized heart function; and/or criteria surrounding infectious diseases, such as criteria that includes isolation periods based on the type of infection and treatment response, influencing how long a patient must stay. Patient stay criteria may additionally be influenced by the individual based on historic medical data that may provide context for longer stays.

In further reference to FIG. 1, in an embodiment, a plurality of data 124 may be collected by means of a web-crawler 132. A web-crawler 132 may also be known as a web-spider or web-robot, is an automated program or script designed to browse the internet systematically and collect data from websites. Web-crawlers 132 may allow systems, such as system 100, to index content and gather information from the vast array of web pages available online. Web-crawler 132 may start with a list of URLs and follow links on those pages to discover and index new content. The web-crawler 132 may retrieve web pages, analyze their content, and store relevant information in a database 120. For example, web-crawler 132 may start with websites related to compliance requirements and/or websites related to patient feedback and/or surveys. Components of a web-crawler 132 may include URL queue, a downloader, a parser, and storage. The URL queue is a list of URLs to visit, which may be dynamically updated as new links are discovered. The downloader is a component that retrieves web pages from the internet. A parser analyzes the content of the downloaded pages, extracting useful data and identifying new links. Further, storage may include a database 120 and/or a file system where the crawled data may be stored for future retrieval and analysis. Web-crawler 132 may include a general crawler, a focused crawler, and/or an incremental crawler. General crawlers index the broad web for search engines. Whereas focused crawlers target specific types of content or topics, for example academic papers, news articles, and/or the like. Incremental crawlers, on the other hand, regularly revisit previously crawled pages to check for updates. In an embodiment, web-crawler 132 collecting governance data may implement one or a combination of a general crawler, a focused crawler, and/or an incremental crawler, depending on the information being sought. It may be especially beneficial to implement an incremental crawler when retrieving governance data as it may update as laws and regulations change.

In further reference to FIG. 1, in an embodiment, at least a processor 108 is configured to identify one or more sets of criteria 136 from a plurality of data 124, using a language processing module 144. In an embodiment, identifying one or more sets of criteria 136 may be accomplished using a clustering model and a classification model, wherein the clustering model may identify a natural grouping and inform the classification model, and the classification model may utilize named entity recognition processes to identify and classify entities within text. As used herein, "named entity recognition" refers to a process in natural language processing (NLP) that involves identifying and classifying key entities in text into predefined categories. These processes may utilize tokenization, normalization, feature extraction, and/or the like to accomplish entity identification, entity linking, and/or entity organization. "Entity," in this specific context, represents a specific, identifiable piece of information that may be classified into predefined categories. For example, entities may include names, organizations, locations, dates and times, monetary values, percentages, and/or other miscellaneous entities that might not fit into one of the above categories.

In further reference to FIG. 1, in an embodiment, at least a processor 108 is configured to classify each of the one or more sets of criteria using language processing module 144, wherein classifying of each of the one or more sets of criteria 136 generates embeddings 140 related to the one or more sets of criteria 136. In an embodiment, generating these embeddings 140 may include generating criteria embeddings from the one or more sets of criteria and generating profile embeddings from an individual profile. An "embedding" refers to a numerical representation of data, often in a lower-dimensional space. In some embodiments, embeddings may capture the semantic meaning of the data. In an embodiment, embeddings 140 may be generated using a large language model (LLM) and/or a Bidirectional Encoder Representations from Transformers (BERT) encoder. "One or more sets of criteria" refer to specific standards or benchmarks used to evaluate, assess, or make decisions regarding a particular subject, process, or item. For example, in an embodiment, one or more sets of criteria 136 may be related to patient stay criteria. In some instances, one or more sets of criteria 136 may include a set of criteria defined by an insurance policy.

With continued reference to FIG. 1, In one or more embodiments, embeddings 140 may include one or more vectors. A "vector" as defined in this disclosure is a data structure that represents one or more a quantitative values and/or measures of an individual profile 148 and/or one or more sets of criteria 136. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum\nolimits_{i=0}^{n} a_i^2},$$

where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted ‖a‖ indicating the vector's length or size, and may be defined, as a non-limiting example, according to a Euclidean norm for an n-dimensional vector a as:

$$\|a\| = \sqrt{\sum_{i=0}^{n} a_i^2}$$

In an embodiment, and with continued reference to FIG. 1, each data element may be represented by a dimension of a vector space; as a non-limiting example, each element of a vector may include a number representing an enumeration of co-occurrences of individual profile 148 represented by the vector with one or more sets of criteria 136. Alternatively, or additionally, dimensions of vector space may not represent distinct data elements, in which case elements of a vector representing an individual profile 148 may have numerical values that together represent a geometrical relationship to a vector representing one or more sets of criteria 136, wherein the geometrical relationship represents and/or approximates a semantic relationship between the individual profile 148 and the one or more sets of criteria 136. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below.

Any vectors as described herein may be scaled, such that each vector represents each attribute along an equivalent scale of values. In an embodiment associating individual profile 148 and one or more sets of criteria 136 to one another as described above may include computing a degree of vector similarity between a vector representing each data element and a vector representing another data element; vector similarity may be measured according to any norm for proximity and/or similarity of two vectors, including without limitation cosine similarity. As used in this disclosure "cosine similarity" is a measure of similarity between two-non-zero vectors of a vector space, wherein determining the similarity includes determining the cosine of the angle between the two vectors. Cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval (0,π) radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. Additionally, or alternatively, degree of similarity may include any other geometric measure of distance between vectors.

With further reference to FIG. 1, in an embodiment, identifying one or more sets of criteria 136 may be accomplished using a classification model. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 120, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in an embodiment, at least a processor 108 may identify one or more sets of criteria 136 by using a language processing module 144. Language processing module 144 may include any hardware and/or software module. Language processing module 144 may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 144 may operate to produce a language processing model. Language processing model may include a program automatically generated by computing device 104 and/or language processing module 144 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory 112 at computing device 104, or the like.

Still referring to FIG. 1, language processing module 144 and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 144 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Alternatively or additionally, and with continued reference to FIG. 1, language processing module 144 may be produced using one or more large language models (LLMs). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, governance and compliance documents, and the like. In some embodiments, training sets of an LLM may include information from one or more public or private databases 120. As a non-limiting example, training sets may include databases 120 associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in an embodiment, BERT may implement a transformer architecture having an "attention mechanism" configured to dynamically determine and assign weight e.g., importance of different tokens such as text characters, words, nucleotides, kmers, or the like. Exemplary attention mechanism may include, without limitation, generalized attention self-attention, multi-head attention, additive attention, global attention, and the like. In some cases, transformer architecture may be implemented as an encoder-decoder structure having an encoder configured to map an input sequence to a higher dimensional space i.e., a sequence of continuous representations, and a decoder configured to transform output of the encoder into a final output sequence, such as without limitation an embedding representing a nucleotide sequence. In other cases, transformer architecture may include only an encoder stack. As a non-limiting example, BERT may include a plurality of layers each contains one or more sub-layers, wherein a first sub-layer may include a multi-head self-attention mechanism, and a second sub-layer may include a position-wise fully connected feed-forward network. In some cases, plurality of layers may be identical. In some cases, multi-head self-attention mechanism may configure BERT to focus on different parts of the input sequence when predicting elements of an embedding to be output; for instance, and without limitation, self-attention mechanism may be described by an attention function:

$$\text{Attention }(Q, K, V) = \text{softmax}\left(\frac{QK^T}{\sqrt{d_k}}\right)V$$

Where Q, K, and V represent a set of queries, keys, and values matrices respectively, and $d_k$ is the dimensionality of the keys. In a non-limiting embodiment, in the context of analysis of RNA, a self-attention mechanism may take output of previous layer X and produce outputs C, using weight matrices $W_i^V$ based on query matrix $Q_i=[q_1^i, \ldots, q_n^i]$, key matrix $K_i=[k_1^i, \ldots, k_n^i]$, and value matrix $V_i=[v_1^i, \ldots, v_n^i]$ as follows:

$$C = \text{Concat}(\text{head}_1, \ldots, \text{head}_H)W^O (\text{inner product with the } W \text{ one})$$

$$\text{head}_i = \text{softmax}\left(\frac{(Q_i)(K_i)^T}{\sqrt{D}}\right)V_i$$

where $$Q_i = XW_i^Q, K_i = XW_i^K, V_i = XW_i^V$$

representing inner products with sets of weights $W_i^Q$, $W_i^K$, and $W_i^V$, which are the weights to be tuned when training BERT. These matrices may be of size D×D that where D is the input and output vector dimension, which may be, as a non-limiting example, 120 elements. In the above-described example, each head may calculate a subsequent hidden state by computing an attention-weighted sum of a value vector v.

Figure 4:
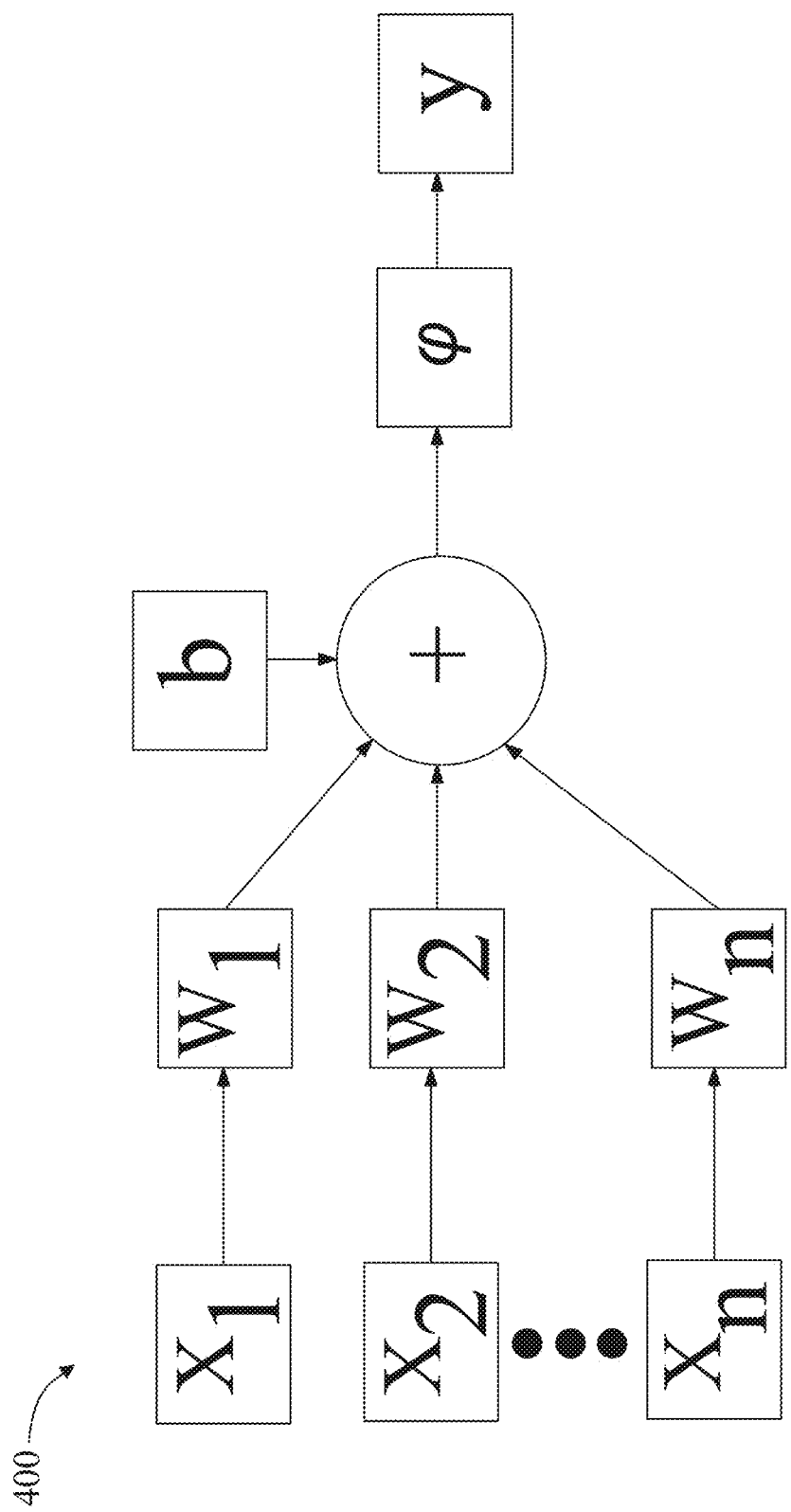
FIG. 4 is a diagram of an exemplary embodiment of a node of a neural network.

In some cases, and still referring to FIG. 4, position-wise fully connected feed-forward network within second sub-layer of each layer may apply a linear transformation to each position separately and identically, for example, and without limitation, position-wise fully connected feed-forward network may be configured to process the output of the attention mechanism according to equation FFN(x)=max (0, $xW_1+b_1$) $W_2+b_2$, where $W_1$, $W_2$, $b_1$, and $b_2$ are parameters of the feed-forward and x is the input to the feed-forward network. In other words, second sub-layer may include two convolutions with a kernel size 1 and a ReLu activation in between.

With continued reference to FIG. 4, in one or more embodiments, BERT's input representation may combine a plurality of embeddings of tokens, segments, and/or positions. In some cases, each token may be processed, for example and without limitation, through a WordPiece tokenization. Output of BERT may include a fixed-length vector that represents the input token's contextual relationships that suitable for downstream tasks, such as, without limitation, processes describe above. In some cases, implementing BERT for generation of representations of may include pre-training (bidirectionally) which involves one or more unsupervised tasks; for instance, and without limitation, processor may be configured to execute a Masked Language Model (MLM) and a Next Sentence Prediction (NSP). In a non-limiting example, at least a portion of nucleotide sequence in each nucleotide sequence example may be randomly masked, and the model may learn to predict masked nucleotide sequence portions based on the context. NSP may train the model to predict, for example, and without limitation, whether two given subsequences logically follow each other. Additionally, BERT may be fine-tuned to adapt pre-trained representations. In some cases, fine-tuning BERT may include iteratively training BERT's parameters on structural alignment learning and/or masked language model learning with minimal adjustments required from the pre-trained model as described above; for instance, and without limitation, a loss function used for fine-turning may be represented as:

$$L = -\log\left(\frac{e^{s(correct)}}{\sum_j^n e^{s(j)}}\right)$$

Wherein L is the loss, s(correct) is the score of the correct label, and s(j) is the score of each possible label. It should be noted that other exemplary downstream tasks e.g., sentiment analysis, question answering, named entity recognition (NER), among others may be adapted and optimized based on the apparatus and methods described in this disclosure. As a person skilled in the art, upon reviewing the entirety of this disclosure, will be well versed in the model architectures, including multi-head self-attention mechanism and position-wise fully connected feed-forward network as described herein.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database 120. As a non-limiting example, specific training set may include text related to the users such as user specific data for electronic records correlated to examples of outputs. In an embodiment, training one or more machine learning models May include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decoder model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it May verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am"

should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier may be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device 104 that is used by a user. As non-limiting examples, user device may include desktops, laptops, smartphones, tablets, and the like. In some embodiments, input may include any set of data associated with patient stay criteria.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 144 may use a corpus of documents to generate associations between language elements in a language processing module 144, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface 160, or may communicate identities of significant documents according to any other suitable method of electronic communication, or by providing such identity to other persons who may enter such identifications into computing device 104. Documents may be entered into a computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database 120 or compendium of documents such as JSTOR as provided by Ithaka Harbors, Inc. of New York.

In further reference to FIG. 1, in an embodiment, at least a processor 108 is configured to input one or more sets of criteria 136 and an individual profile 148 into a dynamic decision template 152, wherein the dynamic decision template 152 adapts the data type of the one or more sets of criteria 136 and the individual profile 148. As used throughout this disclosure, a "dynamic decision template" is a structured framework used to facilitate decision-making processes in changing or uncertain environments. For example, dynamic decision templates 152 may adapt to various scenarios by incorporating real-time data, flexible criteria, and iterative evaluation. In an embodiment, dynamic decision template 152 may receive one or more criteria and an individual profile 148. Wherein one or more criteria may include medical necessity, discharge readiness, and/or insurance reimbursement; and wherein an individual profile 148 may include healthcare guidelines, resource availability, treatment progress, patient data. An "individual profile," as used here within, is a profile associated with an individual of an entity. For example, an individual may include a patient. In an embodiment, individual profile 148 may include patient-specific data as well as facility-specific data. In one or more embodiments, dynamic decision template 152 may enable real-time monitoring, wherein dynamic decision template 152 continuously monitors patient data and alerts healthcare providers to any significant changes, for example deteriorating health, new symptoms, and/or the like. Further, dynamic decision template 152 may assign weights to different criteria based on their importance, for example medical stability may carry more weight than logistical factors. In some embodiments, dynamic decision template 152 may enable a user to run a scenario analysis, wherein a user may run different scenarios based on hypothetical changes. In such an embodiment a user may compare potential outcomes 172 of continued hospitalization versus discharge. In some embodiments, dynamic decision template 152 may display the various scenarios at a display device 156, wherein display device 156 may include a graphical user interface 160 (GUI).

In an embodiment, at least a processor 108 is configured to apply the context-specific set of criteria using a dynamic decision template to generate an outcome 172. A dynamic decision template 152 may be formatted by defining an objective, identifying key data elements, developing decision points, establishing criteria and guidelines, and integrating risk assessment tools. Here, for example, the objective of the dynamic decision template 152 may include assessing length of stay, identifying discharge criteria, and/or evaluating treatment plans. Key elements used to work toward this objective may include patient demographics, clinical indicators, medical history, current treatment plan, and/or stay criteria. In other words this may include information from individual profile 148 and/or one or more sets of criteria 136. In an embodiment, dynamic decision template 152 may update based on changes in individual profile 148 and/or one or more sets of criteria 136. This offers a real-time analysis of all relevant data to a patient and the relevant stay criteria. In some embodiments, standardized forms may be developed and put into use in documentation processes. For example, this may include standardized patient intake form and/or the like. Forming a dynamic decision template 152 may include developing decision points, which may include creating flowcharts and/or decision trees. In an embodiment, developing decision points may outline key decision points based on the collected data from individual profile 148 and/or one or more sets of criteria 136. For example, and without limitation, if a patient's vital signs are stable and lab results are within normal ranges, consider discharge. Or for example, if the patient has multiple comorbidities, extend the evaluation period before discharge. In an embodiment, establishing criteria and guidelines may occur as described in relation to determining one or more sets of criteria 136. Alternatively, and/or additionally, clinical guidelines and protocols for various conditions may be incorporated into one or more sets of criteria 136. Further, in some embodiments, specific thresholds may be set for vital signs, lab results, and/or other clinical indicators that may trigger specific decisions. In one or more embodiments, dynamic decision template 152 may integrate risk assessment tools such as risk stratification. Wherein risk stratification uses scoring systems to assess the risk of complications and/or readmission. This may infer whether a patient should stay longer for observation.

In further reference to FIG. 1, in an embodiment, dynamic decision template 152 may be formatted as a decision tree data structure. For example, this may include each of the one or more sets of criteria 136 and/or calculations to apply the criteria as a node in the decision tree. This may be accomplished by defining the root node, establishing the decision nodes, creating branches for each outcome 172, and defining leaf nodes. In some embodiments, formatting dynamic decision template 152 as a decision tree data structure may include incorporating criteria and guidelines, such as one or more sets of criteria 136 and/or utilizing risk assessment tools, as previously discussed, as nodes. For example, a starting point, or root node may represent the initial decision context, such as a patient's admission status and/or their primary diagnosis. From there, branching criteria may denote each node to a corresponding criterion that influences the decision. For example, these nodes would evaluate key data elements, such as those identified by the one or more sets of criteria 136 and their corresponding embeddings 140. In an embodiment, this may include vital signs, lab results, and/or presence of comorbidities. Branches for each outcome 172 must be established. This may include possible outcomes 172 from each decision node, branches the lead to subsequent nodes or terminal outcomes 172. For example, and without limitation, if vital signs are stable-go to the next node evaluating lab results. Further, if vital signs are unstable-recommend further monitoring or intervention. Leaf nodes represent the final decisions or recommendations based on the evaluations. For example, leaf nodes may include discharge the patient, extend the hospital stay, and/or initiate additional treatment and/or consultation.

Continuing to reference FIG. 1, as used in this disclosure, a "display device" refers to an electronic device that visually presents information to the entity. In some cases, display device 156 may be configured to project or show visual content generated by computers, video devices, or other electronic mechanisms. In some cases, display device 156 may include a liquid crystal display (LCD), a cathode ray tube (CRT), a plasma display, a light emitting diode (LED) display, and any combinations thereof. In a non-limiting example, one or more display devices 160 may vary in size, resolution, technology, and functionality. Display device 156 may be able to show any data elements and/or visual elements in various formats such as, textural, graphical, video among others, in either monochrome or color. Display device 156 may include, but is not limited to, a smartphone, tablet, laptop, monitor, tablet, and the like. Display device 156 may include a separate device that includes a transparent screen configured to display computer generated images and/or information. In some cases, display device 156 may be configured to present a GUI 160 to a user, wherein a user may interact with the GUI 160. In some cases, a user may view a GUI 160 through display. Additionally, or alternatively, processor 108 may be connected to display device 156. In some embodiments, GUI 160 may be updated based on user inputs and the one or more sets of criteria 136.

A "GUI" is a visual interface that allows users to interact with electronic devices through graphical elements rather than text-based commands. Features of a GUI 160 may include, but are not limited to windows, icons, menus, buttons, sliders and controls, and/or any other graphical content configured to assist a user in interacting with an electronic device. As used in this context, "manipulation" refers to actions or interactions a user may perform to modify, control, or navigate through an interface. Such manipulations may require the use of input devices such as, but not limited to mouses, keyboards, and/or touchscreens. For example, manipulations may include clicking, dragging, scrolling, resizing, zooming, hovering, right-clicking, keyboard shortcuts, inputting data, removing data, and/or modifying data.

In continued reference to FIG. 1, in an embodiment, GUI 160 may include one or more event handlers. As used throughout this disclosure, "event handler" refers to functions or methods designed to respond to specific events in a program, particularly in user interface contexts. An "event" is an occurrence that is detected by the program. For example, this may include a mouse click, keyboard input, and/or a change in a form field. In an embodiment, event handlers may include a listener and or binding process. A listener is a function that listens for specific events on an element. For instance, a button or an input field. A binding process is the process of associating an event with its handler. When an event occurs, an event object may be passed to the handler, containing details about the event. Event handlers allow for interactivity, modularity, and reusability. In such that, event handlers enable applications to respond dynamically to user actions, organize code by separating event handling logic from other program logic, and the same handler may be used for multiple elements and/or events. Further, in an embodiment, the feedback from an event handler may be utilized as training data in the training or retraining of models and/or modules as described here within.

Still referring to FIG. 1, in an embodiment, at least a processor 108 is configured to apply the one or more sets of criteria 136 across one or more axes based on the embeddings 140 generated in previous steps as discussed above. comparing one or more sets of criteria 136 and the individual profile 148 across one or more axes may be accomplished using a clustering and classification model. In an embodiment, the clustering model may group one or more axes based on inherent similarities and label one or more resulting clusters based on the inherent similarities. Further, in an embodiment, the classification model may be trained on the labeled one or more resulting clusters and may be configured to predict cluster labels of new data. The clustering and classification of such data may inform which axis an embedding 140 may be applied to. In one or more embodiments, when embeddings 140 are compared they may be compared in relation to a distance metric, wherein the distance metric represents the difference between two points in a given space. In an embodiment, clustering and classification model may include classification processes described throughout this disclosure as well as feature-learning algorithms. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of elements of data, as defined above, with each other. Computing device 104 may perform a feature learning algorithm by dividing elements or sets of data into various sub-combinations of such data to create new elements of data and evaluate which elements of data tend to co-occur with which other elements. In an embodiment, first feature learning algorithm may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device 104 may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{c_i \ni c} dist(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i|\Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between a elements to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

In further reference to FIG. 1, applying one or more criteria to one or more axes based on embeddings 140 may include embedding visualization or embedding projection techniques. Techniques to accomplish this process may include principal component analysis (PCA). Wherein PCA refers to a dimensionality reduction technique that transforms the data to a new coordinate system, where the greatest variance lies on the first axis. Alternatively, in some embodiments, techniques may include t-distributed stochastic neighbor embedding (t-SNE). Wherein t-SNE refers to a technique specifically designed for visualizing high-dimensional data by maintaining local similarities and revealing clusters in lower-dimensional space. In some embodiments, techniques may include uniform manifold approximation and projection (UMAP). Wherein UMAP is a technique that focuses on preserving both local and global structure in the data, often providing better performance than t-SNE. Furthermore, in some embodiments, techniques may include linear discriminate analysis (LDA). Wherein LDA is a technique that finds linear combinations of features that best separate different classes.

With continued reference to FIG. 1, in an embodiment, the one or more axes may include one or a combination of a clinical axis, a temporal axis, a demographic axis, a treatment axis, a resource utilization axis, an outcome 172 axis, a geographic axis, a behavioral axis, a social support axis, and/or a technological axis. A clinical axis may include patient diagnoses, symptoms, clinical assessments, comorbidities, and/or the like. A temporal axis may include time points (e.g., dates of admission, discharge, follow-up visits), duration of stay, trends over time, seasonal variations, and/or the like. A demographic axis may include age, gender, ethnicity, race, socioeconomic status, and/or the like. A treatment axis may include interventions, protocol adherence, dosages, frequency of treatment, and/or the like. A resource utilization axis may include healthcare services used, costs, staffing, facility use, and/or the like. An outcome 172 axis may include clinical outcomes 172, patient-reported outcomes 172, functional status, readmission rates, and/or the like. A geographic axis may include location of care, access to care, regional health trends, public health initiatives, and/or the like. A behavioral axis may include lifestyle factors, adherence to treatment, health literacy, risk-taking behaviors, and/or the like. A social support axis may include family support, community resources, social networks, mental health support, and/or the like. A technological axis may include health information technology, wearable devices, data analytics, patient engagement tools, and/or the like. Collectively these axes may provide a comprehensive framework for understanding and analyzing various aspects of patient care and health outcomes 172.

In further reference to FIG. 1, in an embodiment, at least a processor 108 is configured to generate a context-specific set of criteria 164 by integrating the embeddings 140 of the one or more sets of criteria 136 with an individual profile 148. This may be accomplished as a function of the comparison between the one or more sets of criteria 136 and the individual profile 148. In an embodiment, this may be accomplished using a deep learning model, such as a deep neural network (DNN). In such an embodiment, one or more nodes may represent an individual entity (e.g., a patient, treatment, or symptom) within a larger system. Wherein one or more axes may represent a dimension or attribute relevant to the entities represented by the nodes. Each node of the system may have attributes corresponding to the various axes. For example, a patient node may include attributes related to the clinical axis, demographic axis, temporal axis, and/or geographic axis. Whereas a hospital node may include attributes related to the resource utilization axis, the outcome 172 axis, and/or the like.

Continuing to reference FIG. 1, in an embodiment, context-specific set of criteria 164 and associated data may be displayed at display device 156 including a GUI 160. For example, deep learning model may produce graphical representations, dynamic visualizations, and/or dashboards enabling a user to interact with the context-specific set of criteria 164 and the parameters defining the context-specific set of criteria 164. In some embodiments, at least a processor 108 may be configured to store context-specific set of criteria 164 at database 120. Deep learning model may access database 120 and retrieve and/or receive new data to update system 100.

Still referring to FIG. 1, in an embodiment, context-specific set of criteria 164 may be output as instructions 168. The context-specific set of criteria instructions 168 may include a list of requirements and/or considerations that must be followed prior to the discharge of a patient. For example, this may include a checklist and/or written descriptions of the procedures to be followed. In an embodiment, context-specific set of criteria instructions 168 may include base instructions and additional instructions specific to an individual patient. "Base instructions," as used here, refer to criteria that must be met no matter the individual being services. For example, base instructions may include any criteria related to regulations and/or liability criteria. Additional instructions specific to an individual patient may take into consideration historic outcomes 172 and/or hospital specific policies and/or procedures. Context-specific set of criteria instructions 168 may include instructions regarding medical stability, treatment completion, care plan, patient understanding, support system, home environment safety, required equipment, and/or documentation. Each instruction may include one or more steps that must be completed or checked off prior to discharge of a patient. This may be displayed at a display device 156, wherein a user is enabled to interact with GUI 160 to track progress of the patient.

In further reference to FIG. 1, in an embodiment, context-specific set of criteria instructions 168 may interface with one or more external systems 128 allowing for seamless integration and communication across platforms. For example, and without limitation, external systems 128 may include electronic health record systems to update patient information, treatment plans, and/or discharge summaries; laboratory information systems to integrate with labs to order tests, receive results, and/or update patient records accordingly; pharmacy systems to connect with pharmacy management systems for electronic prescriptions and medication reconciliation; health information exchange systems to share patient data across different healthcare organizations; billing and insurance systems to manage claims, insurance verification, and/or patient billing; telehealth platforms to facilitate remote consultations and/or follow-up care; patient management systems to assist in managing patient appointments, referrals, and/or care coordination; medical device systems to transmit data for real-time monitoring and assessment; and/or population health management systems to integrate with tools that analyze patient data for broader health trends and interventions. The ability to seamlessly integrate with each of these interfaces enables system 100 to streamline processes and improve patient care overall.

Figure 2:
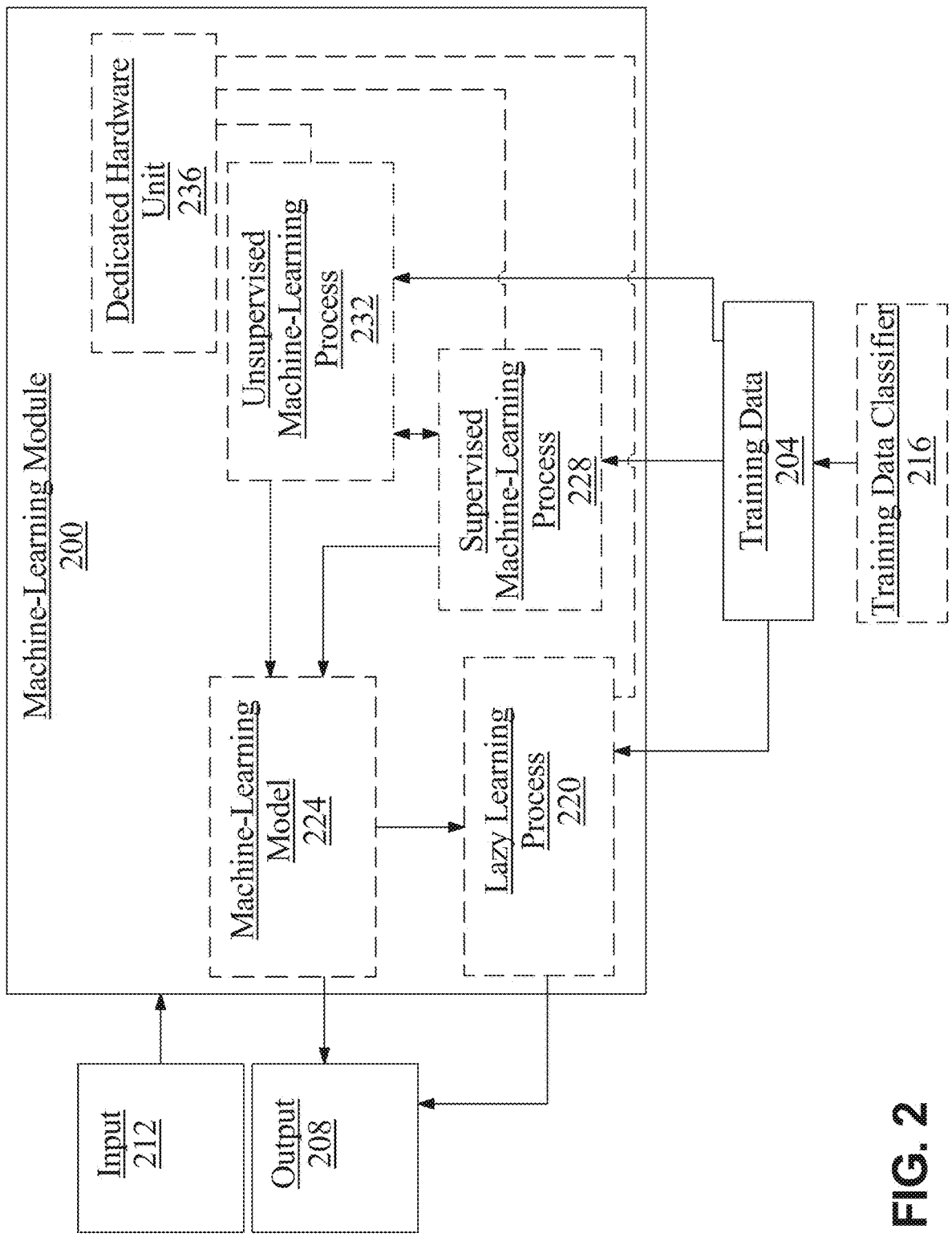
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to sub-characterize data as patient stay criteria.

Still referring to FIG. 2, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
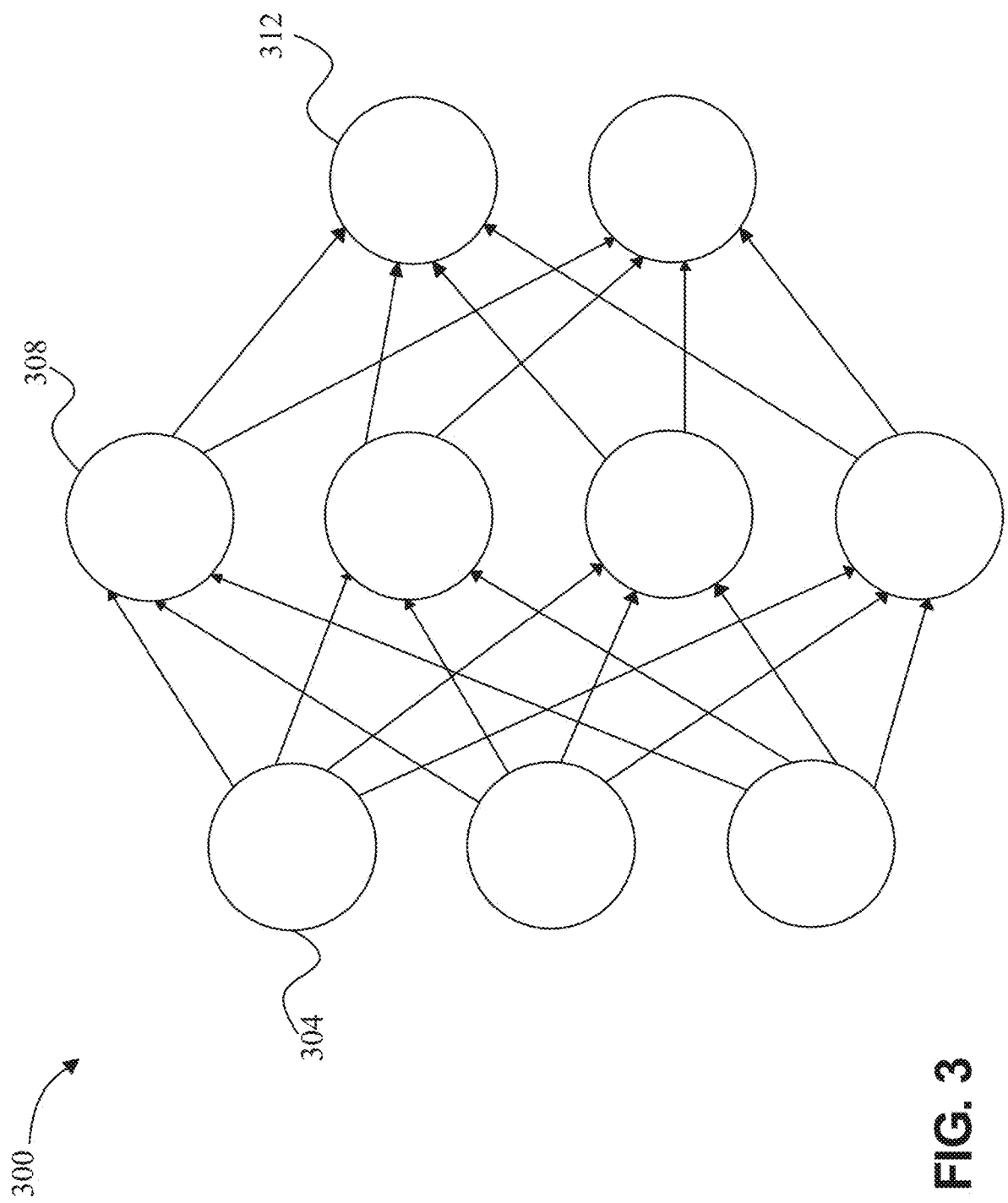
FIG. 3 is a diagram of an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
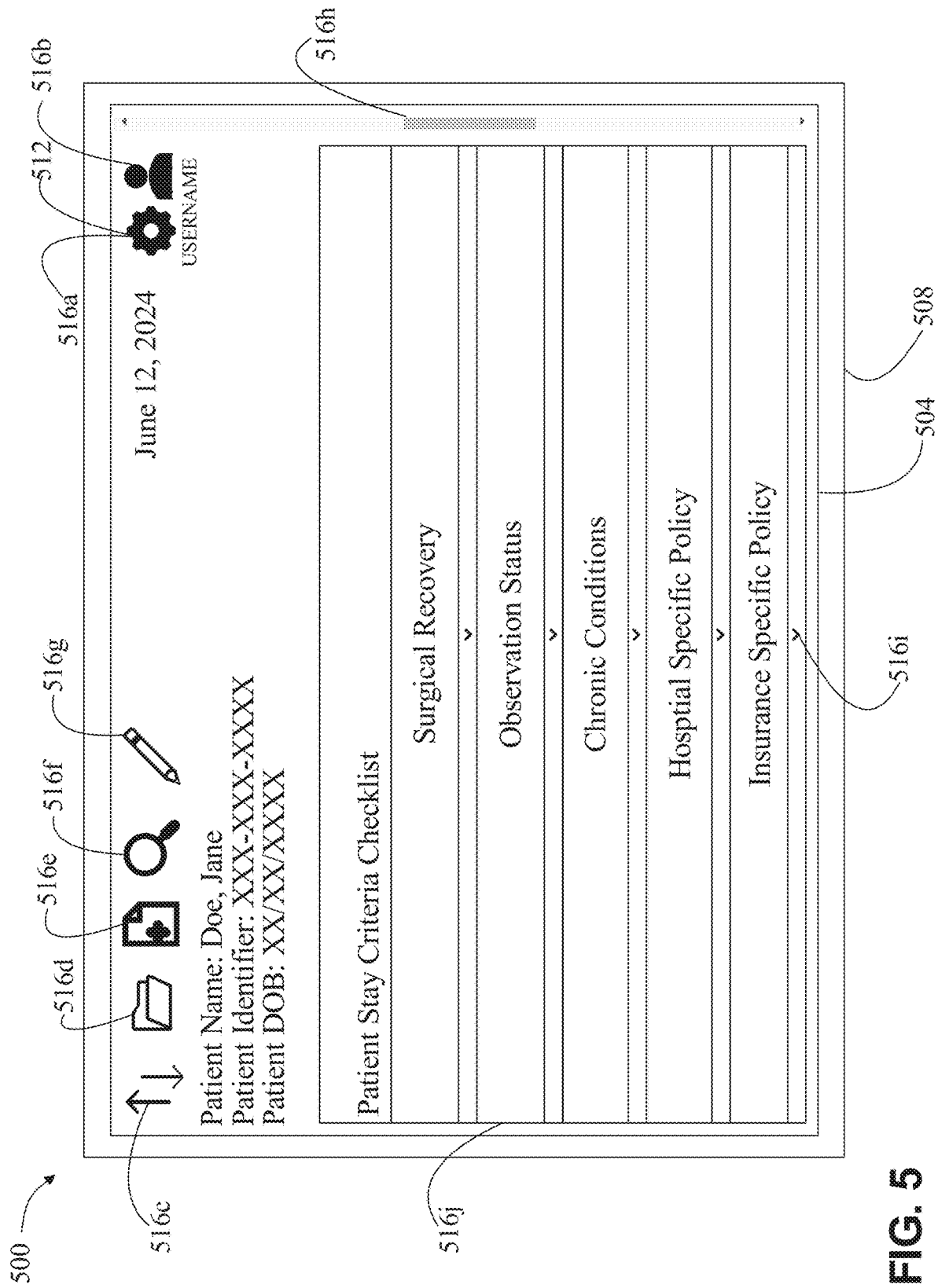
FIG. 5 is an exemplary illustration of a graphical user interface.

Now referring to FIG. 5, an exemplary illustration 500 of a GUI is shown. In an embodiment, GUI may be displayed using a downstream device 508. In an embodiment, the graphical user interface 504 may include at least a visual element 512. In an embodiment, the visual element 512 may include an interactive element 516. In an embodiment the interactive element 516 may allow a user to engage directly with the graphical user interface 504 through a variety of actions.

In an embodiment, the interactive element 516 may include a settings gear 516a, a profile icon 516b, a sorting icon 516c, a folder icon 516d, a new task icon 516e, a find icon 516f, an edit icon 516g, a scroll bar icon 516h, one or drop down icons 516i, a content window 516j, and/or the like.

In an embodiment, the interactive element 516 may include a settings gear 516a. In an embodiment, the settings gear 516a may enable users to access the system or application settings where they may modify preferences and configurations. Without limitation, by clicking on the settings gear 516a, users may adjust features like notifications, display options, account details, and the like. In an embodiment, the settings gear 516a may represent control over personalizing the environment within the application. In an embodiment, the settings gear 516a may ensure that users can customize their experience to meet their specific needs.

In an embodiment, the interactive element 516 may include a profile icon 516b, which may allow users to access their personal profile settings. In an embodiment, the profile icon 516b may link to a page where users may view and edit their personal information, such as their name, contact details, or profile picture. In an embodiment, the profile icon 516b may make it simple for users to manage their account and view related data quickly. In an embodiment, the profile icon 516b may be placed in a convenient location, allowing easy access to account settings. In an embodiment, the profile icon 516b may help users maintain control over their profile, ensuring that their information stays up-to-date.

In an embodiment, the interactive element 516 may include a sorting icon 516c, which may allow users to organize data based on specific criteria. In an embodiment, the sorting icon 516c may be useful when dealing with large datasets or lists that need to be filtered or reordered. Without limitation, by clicking the sorting icon 516c, users may arrange items by various attributes such as date, name, priority, and the like. In an embodiment, the sorting icon 516c may simplify the process of locating specific information, making the interface more efficient to use. In an embodiment, the sorting icon 516c may ensure that users can easily customize how they view and interact with the content.

In an embodiment, the interactive element 516 may include a folder icon 516d, which may represent access to a file or document management system. Without limitation, by clicking on the folder icon 516d it may open a directory or list of stored files, allowing users to organize their content within the application. In an embodiment, the folder icon 516d may be essential for managing documents, media, or other file types efficiently. In an embodiment, the folder icon 516d may be associated with file storage and navigation, making it a familiar and intuitive tool for users. In an embodiment, the folder icon 516d may aid in keeping information organized and accessible within the system.

In an embodiment, the interactive element 516 may include a new task icon 516e, which may allow users to create or add a new item to their task list or project. In an embodiment, the new task icon 516e may provide a quick way for users to input new assignments or goals, streamlining task management. In an embodiment, the new task icon 516e once clicked, may open a form or prompt where users may specify details about the new task. In an embodiment, the new task icon 516e may help users stay organized by adding tasks efficiently as they arise. In an embodiment, the new task icon 516*e* may be a valuable tool for productivity, helping users keep track of their to-do lists.

In an embodiment, the interactive element 516 may include a find icon 516*f*, which may function as a search tool for locating specific information within the application. In an embodiment, the find icon 516*f* may allow users to quickly search through data, files, or content to pinpoint exactly what they need. In an embodiment, the find icon 516*f* may be especially useful in applications that manage large volumes of information or files. In an embodiment, the find icon 516*f* may enhance efficiency by reducing the time spent manually browsing through content. Continuing, by providing a fast search function, users may access information more quickly and effectively.

In an embodiment, the interactive element 516 may include an edit icon 516*g*, which may enable users to modify or update existing content within the application. Continuing, by clicking on the edit icon 516*g*, it may bring users to an editable version of the item, such as a text document, task, or file. In an embodiment, the edit icon 516*g* may allow users to make corrections or updates as needed, maintaining the accuracy of the information. In an embodiment, the edit icon 516*g* may ensure that content remains current and can be easily adjusted as situations or data change. In an embodiment, the edit icon 516*g* may be a crucial tool for users who frequently update or revise their work.

In an embodiment, the interactive element 516 may include a scroll bar icon 516*h*, which may provide users with the ability to navigate through long pages of content. In an embodiment, the scroll bar icon 516*h* may be essential when the content exceeds the available screen space, allowing users to scroll vertically or horizontally. In an embodiment, the scroll bar icon 516*h* may help users move through information at their own pace, ensuring they can access all relevant content. In an embodiment, the scroll bar icon 516*h* may be particularly useful in applications with extensive data, such as documents or databases. In an embodiment, the scroll bar icon 516*h* may enhance the user interface by making navigation simple and intuitive.

In an embodiment, interactive element 516 may include one or more drop down icons 516*i*. This may be displayed in a content window 516*j*. The content window 516*j* may display relevant content, such as a patient stay criteria checklist. In an embodiment, each section of the content window 516*j* may include a drop down icon 516*i*, wherein a user may click on or otherwise interact with the drop down icon 516*i* and another window may be shown detailing the content window 516*j* contents further. For example, this may include various tasks that must be completed prior to a patient's dispatch.

Figure 6:
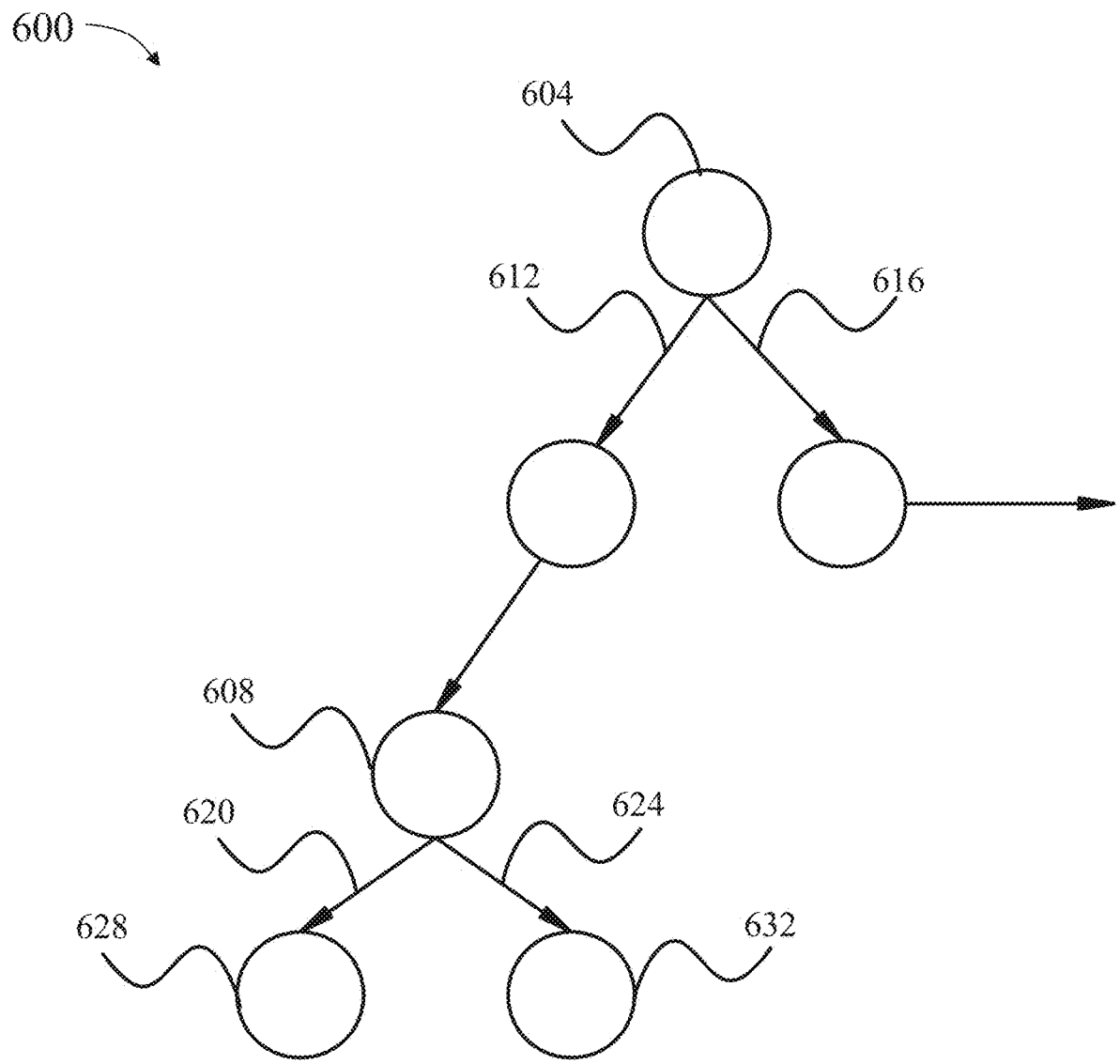
FIG. 6 is a block diagram illustrating an exemplary embodiment of a design decision tree.

Referring now to FIG. 6, an exemplary diagram of a decision tree, 600, to determine an outcome of a context-specific set of criteria. In an embodiment, decision tree 600 may include root node 604, wherein root node 604 is the starting point of decision tree 600 and represents a primary decision question. In an embodiment, decision tree 600, may include at least a decision node 608, wherein at least a decision node represents a point at which decision tree 600 is required to make a decision based on specific conditions or specific criteria. In an embodiment, at least a decision node 608 may result in a subsequent decision node or a terminal node, wherein the terminal node represents the final outcome of decision tree 600. In an embodiment, decision tree 600 may include branches 612 and 616. In an embodiment, branches 612 and 616 represent the path that stems from a particular decision and represent different choices based on the condition. For example, and without limitation, branch 612 may represent a path where the outcome is to conduct one or more additional discharge checkpoints and 616 may represent a path where the outcome is discharge the patient. In another non-limiting example, branch 620 may represent a path where the outcome is to extend the patient's stay without additional patient information whereas branch 624 may represent a path where the requires additional patient information to determine an outcome. In a non-limiting example, the decision tree may prompt the user to conduct one or more tests or checks to determine the best outcome fit for a patient. In an embodiment, terminal node 628 and terminal node 632 may represent the final outcome of the decision wherein terminal node 628 finishes the computation using the guidelines and terminal node 632 transmits a prompt to the user to require more information from the patient to be entered to complete the computation.

Figure 7:
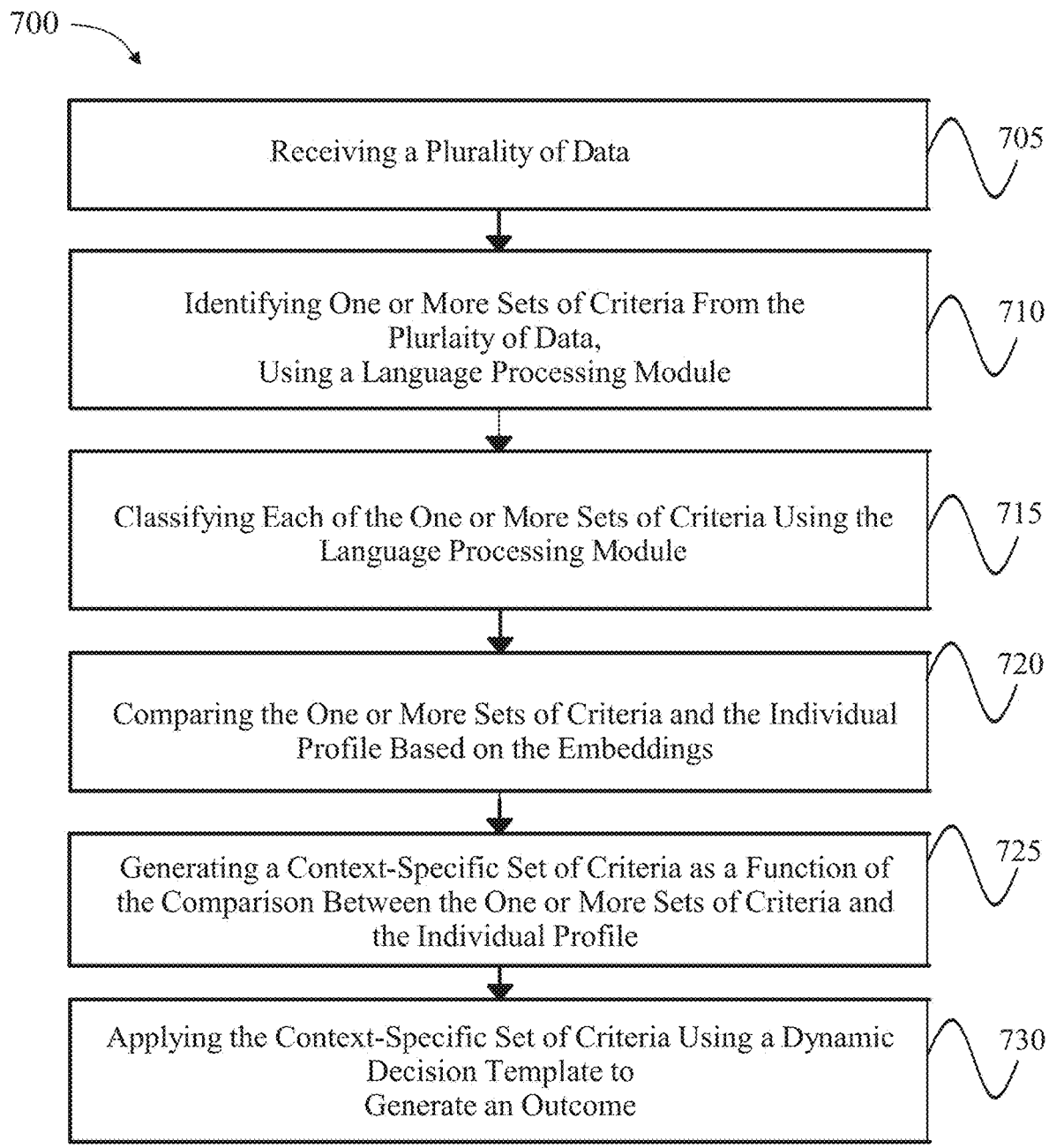
FIG. 7 is a flow diagram of an exemplary method for identifying one or more sets of criteria from textual data.

Referring now to FIG. 7, a flow diagram illustrating an exemplary method 700 of identifying one or more criteria from textual data is shown. Method 700 of identifying one or more criteria from textual data may include a step 705 of receiving a plurality of data. This may be implemented as discussed in reference to FIGS. 1-6. Method 700 of identifying one or more criteria from textual data may include a step 710 of identifying one or more sets of criteria from the plurality of data, using a language processing module. In an embodiment, step 710 may include using a clustering model and a classification model, wherein the clustering model identifies a natural grouping and informs the classification model, and the classification model utilizes named entity recognition processes to identify and classify entities within text. This may be implemented as discussed in reference to FIGS. 1-6. Method 700 of identifying one or more sets of criteria from textual data may include a step 715 of classifying each of the one or more sets of criteria using the natural language processing module, wherein classifying each of the one or more sets of criteria includes generating criteria embeddings from the one or more sets of criteria, and generating profile embeddings from an individual profile. This may be implemented as described in reference to FIGS. 1-6. Method 700 of identifying one or more sets of criteria from textual data may include a step 720 of comparing the one or more sets of criteria and an individual profile based on the embeddings. In an embodiment, step 720 may include using a clustering model and a classification model, wherein the clustering model groups one or more axes based on inherent similarities and label one or more resulting clusters based on the inherent similarities, and the classification model is rained on the labeled one or more resulting clusters and is configured to predict cluster labels of new data. Further, in an embodiment, the one or more axes may include a clinical axis, a temporal axis, a demographic axis, a treatment axis, a resource utilization axis, an outcome axis, a geographic axis, a behavioral axis, a social support axis, and/or a technological axis. This may be implemented as discussed in reference to FIGS. 1-6. Method 700 of identifying one or more sets of criteria may include a step 725 of generating a context-specific set of criteria as a function of the comparison between the one or more sets of criteria and the individual profile. In an embodiment, step 725 may include using a deep learning model, wherein using the deep learning model includes applying a deep clustering algorithm that leverages the criteria embeddings and the profile embeddings to group the one or more sets of criteria and the individual profile into meaningful clusters, train the deep learning model on the labeled clusters to classify new data, allowing for nuanced sentiment predictions based on learned features, and iteratively update the deep learning model with new data to adapt the clustering and classification models. In some embodiments, the deep learning model may utilize multi-task learning, wherein multi-task learning allows the deep learning model to learn shared representations that benefit both tasks of clustering and classifying the one or more sets of criteria and the individual profile. This may be implemented as discussed in reference to FIGS. 1-6. Method 700 of identifying one or more sets of criteria from textual data may include a step 730 of applying the context-specific set of criteria using a dynamic decision template to generate an outcome. In an embodiment, step 730 of generating an outcome may be accomplished using a deep learning model. This may be implemented as discussed in reference to FIGS. 1-6.

Still referring to FIG. 7, in an embodiment, method 700 of identifying one or more sets of criteria from textual data may further include displaying, at a display device, the context-specific set of criteria. Further, the display device may include a GUI, wherein the GUI is updated based on user inputs and the one or more sets of criteria, which may be iteratively updated. In an embodiment, GUI may include a plurality of event handlers. This may be implemented as discussed in reference to FIGS. 1-6. Method 700 of identifying one or more sets of criteria from textual data may include storing the context-specific set of criteria. Alternatively, and additionally, method 700 of identifying one or more sets of criteria from textual data may include outputting the context-specific set of criteria as instructions. In an embodiment, the instructions may interface or integrate with external systems. This may be implemented as discussed in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
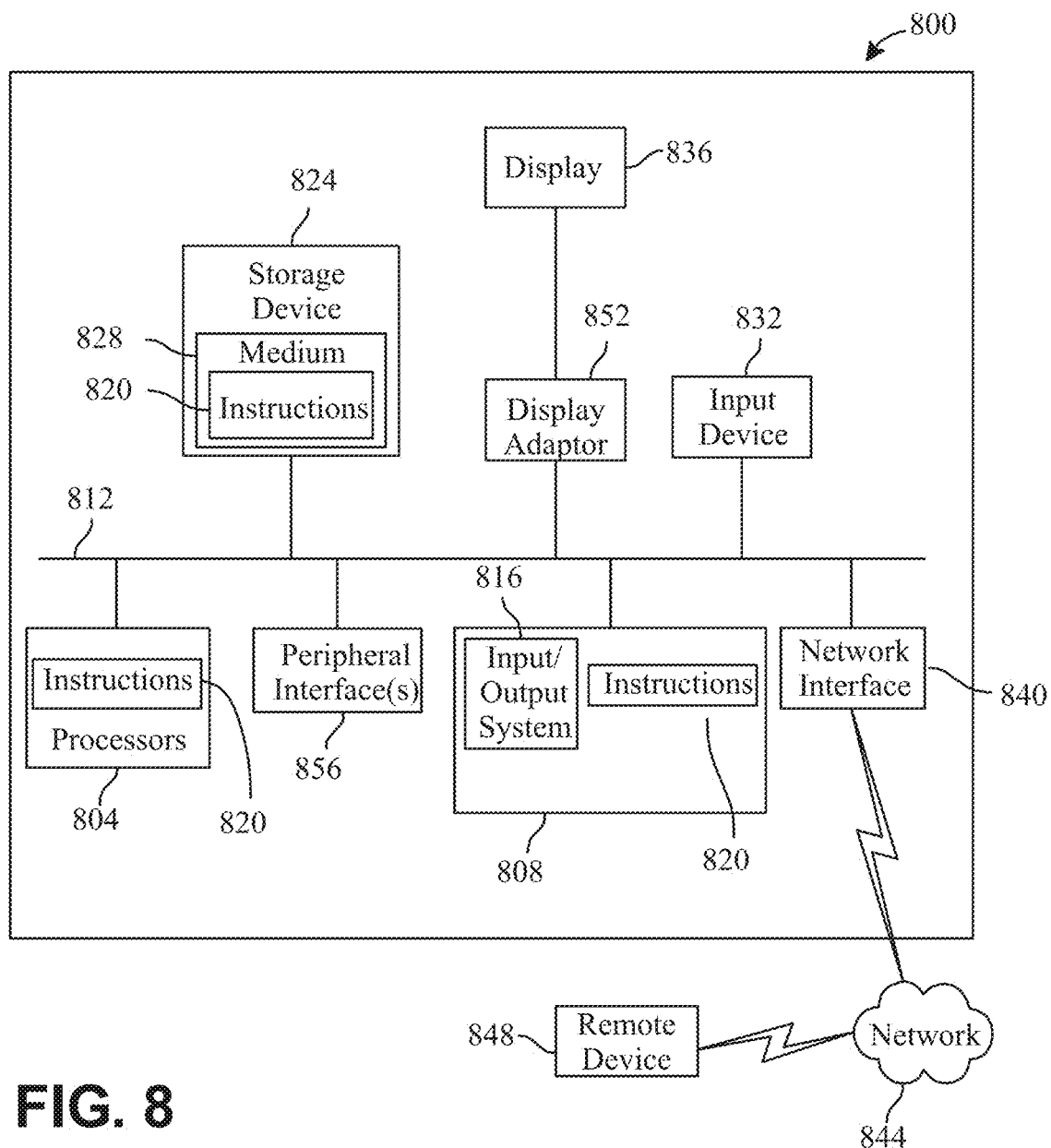
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for identifying one or more criteria from textual data,
wherein the system comprises:
at least a processor; and
a memory communicatively connected to the at least a processor, wherein the memory contains instructions configuring the at least a processor to:
receive a plurality of data;
identify one or more sets of criteria using a language processing module;
classify each of the one or more sets of criteria using the language processing module, wherein classifying each of the one or more sets of criteria comprises:
generating criteria embeddings from the one or more sets of criteria; and
generating profile embeddings from an individual profile;
compare the one or more sets of criteria and the individual profile based on the embeddings, wherein comparing the one or more sets of criteria and the individual profile comprises comparing the one or more sets of criteria and the individual profile across one or more axes comprising at least an axis chosen from a list consisting of a clinical axis, a temporal axis, a demographic axis, a treatment axis, a resource utilization axis, an outcome axis, a geographic axis, a behavioral axis, a social support axis, and a technological axis;

generate a context-specific set of criteria as a function of the comparison between the one or more sets of criteria and the individual profile; and apply the context-specific set of criteria using a dynamic decision template to generate an outcome.

2. The system of claim 1, wherein the at least a processor is further configured to display, at a display device, the context-specific set of criteria and the outcome.

3. The system of claim 2, wherein the display device comprises a graphical user interface (GUI), wherein the GUI is updated based on user inputs and the context-specific set of criteria.

4. The system of claim 3, wherein the GUI comprises a plurality of event handlers.

5. The system of claim 1, wherein the at least a processor is further configured to store the context-specific set of criteria.

6. The system of claim 1, wherein the at least a processor is configured to identify one or more sets of criteria using a clustering model and a classification model, wherein:

the clustering model identifies a natural grouping and informs the classification model; and the classification model utilizes named entity recognition processes to identify and classify entities within text.

7. The system of claim 1, wherein comparing the one or more sets of criteria and the individual profile across one or more axes comprises using a clustering model and a classification model, wherein:

the clustering model groups one or more axes based on inherent similarities and labels one or more resulting clusters based on the inherent similarities; and the classification model is trained on the labeled one or more resulting clusters and is configured to predict cluster labels of new data.

8. The system of claim 1, wherein generating a context-specific set of criteria is accomplished using a deep learning model, wherein generating a context-specific set of criteria using a deep learning model comprises:

applying a deep clustering algorithm that leverages the criteria embeddings and the profile embeddings to group the one or more sets of criteria and the individual profile into meaningful clusters;

train the deep learning model on the labeled clusters to classify new data, allowing for nuanced sentiment predictions based on learned features; and iteratively update the deep learning model with new data to adapt clustering and classification models.

9. The system of claim 8, wherein the deep learning model utilizes multi-task learning, wherein multi-task learning allows the deep learning model to learn shared representations that benefit both tasks of clustering and classifying the one or more sets of criteria and the individual profile.

10. A method for identifying one or more criteria from textual data, wherein the method comprises:

receiving a plurality of data;

identifying one or more sets of criteria from the plurality of data, using a language processing module;

classifying each of the one or more sets of criteria using the language processing module, wherein classifying each of the one or more sets of criteria comprises:

generating criteria embeddings from the one or more sets of criteria; and generating profile embeddings from an individual profile;

comparing the one or more sets of criteria and the individual profile based on the embeddings, wherein comparing the one or more sets of criteria and the individual profile comprises comparing the one or more sets of criteria and the individual profile across one or more axes comprising at least an axis chosen from a list consisting of a clinical axis, a temporal axis, a demographic axis, a treatment axis, a resource utilization axis, an outcome axis, a geographic axis, a behavioral axis, a social support axis, and a technological axis;

generating a context-specific set of criteria as a function of the comparison between the one or more sets of criteria and the individual profile; and applying the context-specific set of criteria using a dynamic decision template to generate an outcome.

11. The method of claim 10, wherein the method further comprises displaying, at a display device, the context-specific set of criteria and the outcome.

12. The method of claim 11, wherein the display device comprises a graphical user interface (GUI), wherein the GUI is updated based on user inputs and the context-specific set of criteria.

13. The method of claim 12, wherein the GUI comprises a plurality of event handlers.

14. The method of claim 10, wherein the method further comprises storing the context-specific set of criteria.

15. The method of claim 10, wherein the method further comprises identifying one or more sets of criteria using a clustering model and a classification model, wherein:

the clustering model identifies a natural grouping and informs the classification model; and the classification model utilizes named entity recognition processes to identify and classify entities within text.

16. The method of claim 10, wherein comparing the one or more sets of criteria and the individual profile across one or more axes comprises using a clustering model and a classification model, wherein:

the clustering model groups one or more axes based on inherent similarities and labels one or more resulting clusters based on the inherent similarities; and the classification model is trained on the labeled one or more resulting clusters and is configured to predict cluster labels of new data.

17. The method of claim 10, wherein generating a context-specific set of criteria is accomplished using a deep learning model, wherein generating a context-specific set of criteria using a deep learning model comprises:

applying a deep clustering algorithm that leverages the criteria embeddings and the profile embeddings to group the one or more sets of criteria and the individual profile into meaningful clusters;

train the deep learning model on the labeled clusters to classify new data, allowing for nuanced sentiment predictions based on learned features; and iteratively update the deep learning model with new data to adapt clustering and classification models.

18. The method of claim 17, wherein the deep learning model utilizes multi-task learning, wherein multi-task learning allows the deep learning model to learn shared representations that benefit both tasks of clustering and classifying the one or more sets of criteria and the individual profile.

* * * * *